United States Patent [19]

Nagamori

[11] Patent Number: 5,678,444

[45] Date of Patent: Oct. 21, 1997

[54] METHOD OF SEQUENTIALLY MANUFACTURING HOLLOW KNOCK PINS

[76] Inventor: Hachiro Nagamori, 2637-2, Oaza-Wakakodama, Gyoda-shi, Saitama-ken, 361, Japan

[21] Appl. No.: 590,209

[22] Filed: Jan. 23, 1996

Related U.S. Application Data

[63] Continuation-in-part of PCT/JP93/01348 filed Sep. 20, 1993.

[51] Int. Cl.[6] .......................... B21D 28/32; B21D 24/16
[52] U.S. Cl. ..................... 72/333; 72/339; 72/349
[58] Field of Search ............................. 72/333, 339, 327, 72/368, 348, 349, 337

[56] References Cited

U.S. PATENT DOCUMENTS

| | | | |
|---|---|---|---|
| 3,348,511 | 10/1967 | Cowles | 72/349 |
| 3,406,554 | 10/1968 | Frankenberg | 72/333 |
| 3,413,945 | 12/1968 | Bertoglio | 72/368 |
| 4,754,908 | 7/1988 | Tanaka | 72/368 |
| 4,903,878 | 2/1990 | Usami | 72/333 |

FOREIGN PATENT DOCUMENTS

| | | |
|---|---|---|
| 54-48673 | 4/1979 | Japan . |
| 56-26492 | 6/1981 | Japan . |
| 1-107923 | 4/1989 | Japan . |

*Primary Examiner*—Daniel C. Crane
*Attorney, Agent, or Firm*—Browdy and Neimark

[57] ABSTRACT

A method of sequentially manufacturing a hollow knock pin avoids distortion due to the large forces of shearing. A rounded corner of a deep-drawn cup shape is supported closely both on the inside radius and on the outside radius by curved walls matched to the cup's surface. The bottom of the cup is punched out close to the rounded corner. Due to the close support, no distortion occurs during the shearing operation. The close support also permits the pin bore to be smoothed by plastic deformation of the metal, without elastic deformation of the lip adjacent to the rounded corner.

3 Claims, 2 Drawing Sheets

METHOD OF SEQUENTIALLY MANUFACTURING HOLLOW KNOCK PINS

CROSS REFERENCE TO RELATED APPLICATIONS

This application is a continuation-in-part of PCT application PCT/JP93/01348, filed Sep. 20, 1993, the entire contents of which are hereby incorporated herein.

FIELD OF THE INVENTION

This invention relates to a positioning component having a structure for assembling components with one another and equipped with a function of penetrating a bolt or connecting fluid passages.

BACKGROUND OF THE INVENTION

Knock pins includes a hollow knock pin capable of penetrating a bolt for fixing components with one another or connecting fluid passages between the components. A method of manufacturing this hollow knock pin involves the steps of expanding a pipe material into a predetermined size by expansion machining, cutting this material into a predetermined length, earring out finish machining of the end face and chamfer machining of a conical plane outside the end face and furthermore, applying cylindrical polishing to the outer diameter of the cylindrical portion.

In this machining process, the pipe expansion step, the end face machining step and the cylindrical polishing step provide individual machining steps due to the properties of a machining equipment. Therefore, works-in-process must be kept during these steps, appurtenant jobs are necessary for the cutting step and the end face machining step due to the occurrence of chips, and a ratio of the net machining time is low in the cutting step. For these reasons, there remains the limit to improving production efficiency.

SUMMARY OF THE INVENTION

To solve the problems described above, the present invention conducts, in the same operation, ironing of the side walls of the cylindrical portion and punching of the bottom portion, for a molded article obtained by preliminarily deep-drawing a plate material into a cup shape having the bottom portion, the flange portion and a predetermined size, by using a cylindrical punch having a cutting edge at the distal end thereof and a die having a drawing curved (or rounded) surface at the inlet and a curved surface of the shape corresponding to the drawn curved surface of the bottom portion of the molded article at the bottom corner thereof. Next, the present invention punches the flange portion along the outside of the cylindrical portion by a stepped punch having a corner curved surface of which comes into close contact with the drawn curved surface of the flange portion and guiding the inner diameter of the cylindrical portion and compression-molds, in the same operation both upper and lower end portions of the molded article, of which chamfered molded portion is allowed to protrude and to fit into a holding jig immediately therebelow, into a chamfer shape by upper and lower molds comprising a stepped punch having a flat surface in an outer peripheral direction and a guide portion having substantially the same size as the inner diameter of the cylindrical portion of the molded article and a die having a conical molding surface at the inlet thereof. Here, the molded article the flange portion of which is so punched is received and held by a jig disposed above the circumference of the disc-like plate in the spaced-apart relation. Because an index is used for rotating the disc-like plate to move the jig on the axis of the molding dies disposed vertically at both end portions, the sequential feed mold portion of deep-drawing of the plate material and molding of both end portions can be interconnected to each other.

The method of the present invention described above preliminarily molds the plate material by deep-drawing into the cup shape having the bottom portion, the flange portion and a predetermined size, irons the side wall of the cylindrical portion, punches next the bottom portion by the die having the curve surface corresponding to the drawn curved surface of the molded article at the corner of the bottom thereof and by the cylindrical punch so that the end portion has the shape and volume similar to the chamfer shape, and punches the flange portion along the outside of the cylindrical portion by the stepped punch having the shape corresponding to the drawn curved surface of the molded article at the corner thereof and the guide portion for guiding the inner diameter of the cylindrical portion. Accordingly, the end face portion has the shape which is a curved surface expanding outward and is similar to the shape obtained by chamfering the inner diameter of the cylindrical portion. However, because the volume is substantially similar to the volume of the chamfer portion of the product, the bottom punch portion and the flange punch portion are shaped into the chamfer shape which can be easily molded. When this flange-punched molded article is fitted to the supporting jig while both end chamfer molded portions are allowed to protrude and to fit into the jig, and is then compression molded by the molds comprising the stepped punch having the guide portion having substantially the same size as the inner diameter of the cylindrical portion of the molded article and the die whose inlet defines a conical molding surface, and disposed above and below the jig, the molded portion undergoes deformation while it is sealed by the mold and the Jig, and the chamfer portion is formed to a desired shape. Here, coarseness of the punch fracture surface of the flange portion can be improved because the molding surface of the die has the conical shape at the inlet thereof, imparts an extreme pressure to the flange fracture surface and provides the burnishing effect during the gradual drawing process from the outer periphery to the inside with the molding operation. On the other hand, coarseness of the chamfer portion of the punched bottom portion can be improved because the chamfer molded portion on the bottom punching side receives a compression-molding load at the time of molding and is corrected by the die molding surface. Unlike the point of intersection between the conical surface chamfered by cutting and the cylindrical portion, the contact point between the chamfered molded surface on the bottom punching side and the cylindrical portion is connected by a certain curve surface and the occurrence of burrs, etc., does not exist at the time of press-in.

At the punching step of the flange described above, the chamfer molded portions at both ends of the flange punched molded article are allowed to protrude and to fit into the receiving jig disposed immediately below the flange punching die. This jig for receiving and holding the molded article is disposed above the circumference of the disc-like plate in the spaced apart relation, is rotated by one pitch at a time by the index in the interlocking arrangement with the punching operation of the flange portion, and moves to the next molding step of both end portions. After molding is made at this step, the molded article is discharged at the next step portion by an ejector pin. Because this index is used, interconnection to the sequential system of deep-drawing of the plate material becomes possible.

DETAILED DESCRIPTION OF THE PREFERRED EMBODIMENT

Next, an embodiment of the method of the present invention will be explained.

Figure 1:
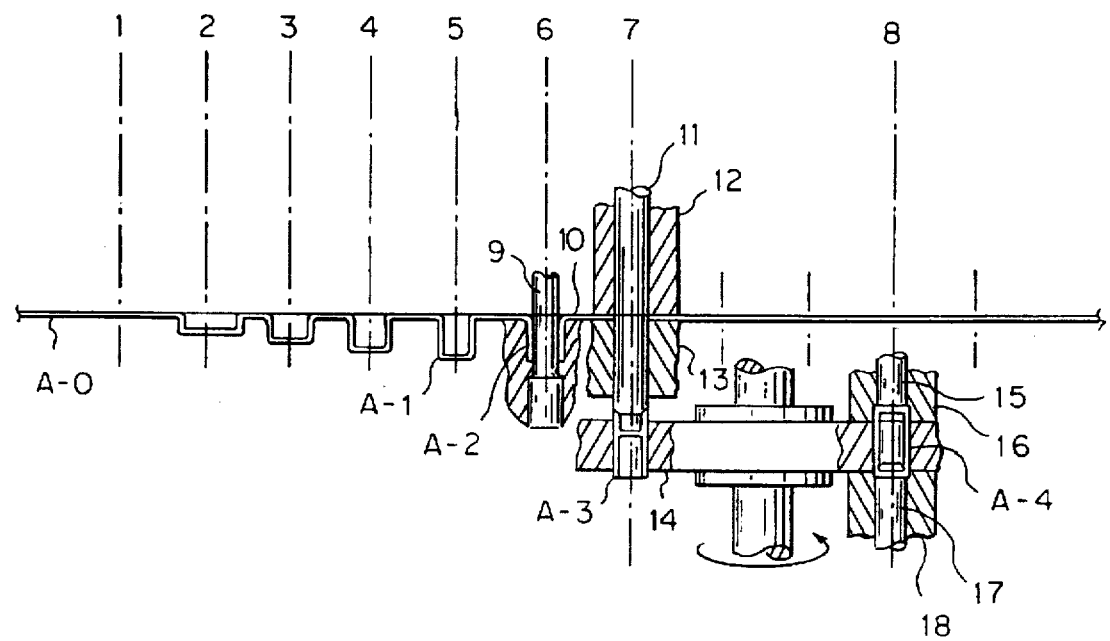
FIG. 1 is a relational diagram showing the process sequence of a sequential feed mold, punching of the bottom portion after ironing, punching of the flange portion and a molding step of end portions.

FIG. 1 shows the relationship between the process steps (1) to (8) for deep-drawing the plate material into a cup shape A-1 having a predetermined size, punching the bottom portion A-2, punching the flange portion A-3, receiving the molded article by the jig 14 on the disc-like plate, rotating the plate by the index and shaping both end portions into the chamfer shape, and the steps for the preliminary molding portion by the sequential system, receiving the molded article A-3 after punching of the flange by the jig 14, rotating the disc-like plate supporting the jig by the index, and transferring the molded article to the next molding step (8) for molding both end portions.

When a plate material A-0 is deep-drawn into a cup equipped with a flange and having a predetermined size for preliminary molding and then ordinary press machining is conducted to obtain a product having the shape described and both ends thereof open, the bottom portion is punched into a smaller size than the inner diameter of the side wall, this portion is expanded by a punch into substantially the same size as the inner diameter of the side wall, and as to the flange portion, the cylindrical portion very close to the flange portion must be cut by a mold or a roll cutter. At this time, the shape of the end portion becomes substantially similar to the shape obtained by cutting the pipe material, and chamfer machining of both ends must be conducted as a separate step. The present invention converts this chamfer machining to the press machining by the steps (6) to (8) in the process diagram 1.

Figure 2:
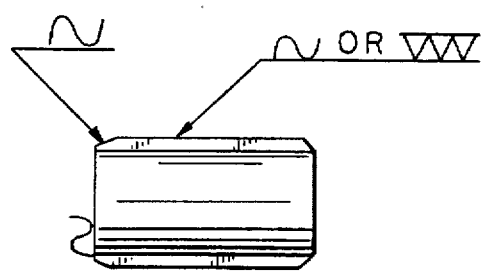
FIG. 2 is an appearance view of the component obtained by the manufacturing method of the present invention.

FIG. 2 shows the appearance of the product obtained by the method of the present invention. The inner and outer diameters of the cylindrical portion have high dimensional precision due to ironing molding at the time of punching of the bottom portion, the surface coarseness is smooth, the chamfer-like molded surface exists on the outer circumference of both ends, and its molded surface is connected by a smooth curve surface to the cylindrical portion. As described above, this product is the positioning component between components and has high dimensional precision of the outer diameter of the cylindrical portion. Further, conical chamfer machining is applied to the outer circumference of both ends of the cylindrical portion whose both ends are open so that the product can be smoothly inserted into the insertion portions of the mating components. Moreover, the inside of the cylindrical portion has the function of penetration of a bolt for fixing mutually the components or interconnection of a fluid passage between the components. The molded article obtained by the method of the present invention has the shape described above, and its entire surface is formed by plastic machining surface. Therefore, burrs, etc., do not occur at the time of insertion, and desired functions can be satisfied.

Press machining of the product shape shown in FIG. 2 is accomplished by ironing the side wall of the cylindrical portion of the molded article obtained by preliminarily molding the plate material into the cup shape, at the bottom punching step, and proceeding with the molding operation of the end face portion while keeping precision of the cylindrical portion. This molding method will be explained below according to the sequence of the machining steps.

1) To facilitate the chamfer shape of both end portions at the final drawing step of preliminary molding shown in FIGS. 1–5, the volume corresponding to the volume of the chamfer portion and the shape are set in advance to similar ones, and the drawn curved surface of the drawn corner portion must be kept small. Therefore, at the final drawing step of preliminary molding, the distal end formation portion of the punch and the drawn curved surface of the die inlet are made small and the bottom portion and the flange portion are flattened at the bottom dead point of drawing in such a manner as to somewhat upset the cylindrical portion. Accordingly, the molding portion is under the lock state by the punch, the die and the extrusion pin and the cylindrical portion is upset, so that its excess metal is gathered and the curved surface of the drawn corner becomes small. When punching is made along the inside and outside of the side wall while the curved surface of this drawn corner is great, the fracture surface overlaps the drawn curved surface, and the corner of the fracture portion becomes a corner having a knife-edge. When this portion is chamfer molded, the knife-edge portion is wound inward or when the inside is restricted, a recess is defined inside, so that a desired shape cannot be obtained in either case.

Figure 3:
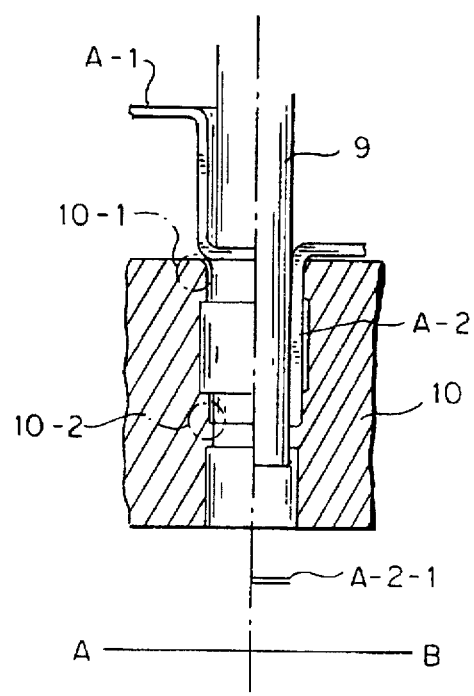
FIG. 3 is a sectional view at the time of punching of the bottom portion after ironing.

2) FIG. 3 shows the detail of ironing of the side wall and punch machining of the bottom of the molded article that is preliminarily molded by the step of FIGS. 1–5. Ironing of the side wall of the cylindrical portion of the molded article A-1 and punching of its bottom portion are carried out in the same step by using the cylindrical punch 9 having a cutting edge at the distal end thereof and a die having a molding surface 10-1 (radius of about 0.5 to about 1 mm) for ironing the side wall of the cylindrical portion at the inlet thereof and having a shape 10-2 corresponding to the drawn curved surface of the molded article at the corner of the bottom portion thereof as shown in FIG. 3. At this time, the bottom portion is punched along the inner diameter of the cylindrical portion. The volume of the bottom portion corresponds to the volume of the chamfer portion of the product and its shape are similar because the die having the bottom shape 10-2 and the punch 9 are used and because the curved surface of the drawn corner of the molded article is made small in advance during preliminary molding step. Here, ironing of the side wall of the cylindrical portion by the drawing surface 10-1 of the die and the punch 9 corrects the thickness of the side wall of the cylindrical portion due to variance of the thickness of the plate material and improves precision of the inner and outer diameters of the cylindrical portion. When the bottom portion is punched, punching is made under the locked state. Accordingly, variance of the end face shape does not occur, the volume of the end portion of the molded article becomes constant and moldability for postmachining becomes high.

Figure 4:
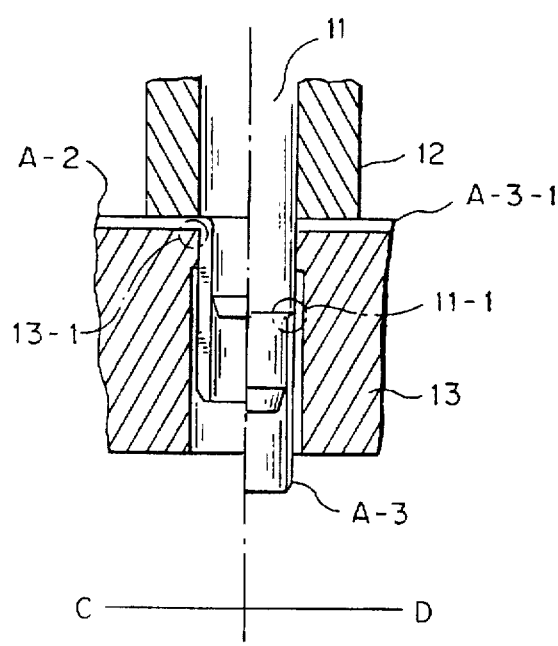
FIG. 4 is a sectional view at the time of punching of the flange.
Figure 5:
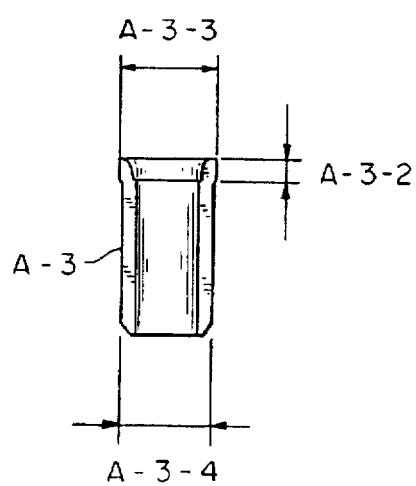
FIG. 5 shows the shape of the component after punching of the flange.

3) FIG. 4 shows in detail the flange punch portion of the step in FIGS. 1–7. In order to provide the volume corresponding to the volume of the chamfer portion at the end portions of the product to the punching portion in this flange punching process, too, in the same way as in the case of the bottom portion, the punch 11 is a stepped punch which has the shape 11-1 corresponding to the drawn curved surface of the molded article at the corner thereof, whose cutting edge portion has a flat surface equal to the size of the end face of the product, and which has a portion for guiding the inner diameter of the cylindrical portion. Further, the inner diameter 13-1 of the die 13 is a size which hardly defines a gap with the outer diameter of the molded article, and punching is made along the outer diameter of the cylindrical portion. The punch portion is punched under the lock state by the restriction by the guide portion of the punch for the inner diameter of the cylindrical portion, and the punch 11 and the die 13 that come into close contact with the drawn curved surface. The punch portion has a curved surface 5 expanding outward, and the outer diameter A-3 of this punch fracture portion is greater than the outer diameter of the cylindrical portion by the size corresponding to the gap between the die and the molded article. The increase of the outer diameter of the punch fracture portion shown in FIG. 5-A-3-2 is the size which does not hinder molding at post-machining steps.

Immediately after punching of the flange portion, the chamfer molded portions at both ends are caused to protrude and to fit into the supporting jig 14 fitting to the outer diameter of the cylindrical portion. The jig is disposed above the circumference of the disclike plate in the spaced-apart relation, and the disclike plate is rotated one pitch at a time by the index and shifts to the next step shown in FIGS. 1–8.

Figure 6:
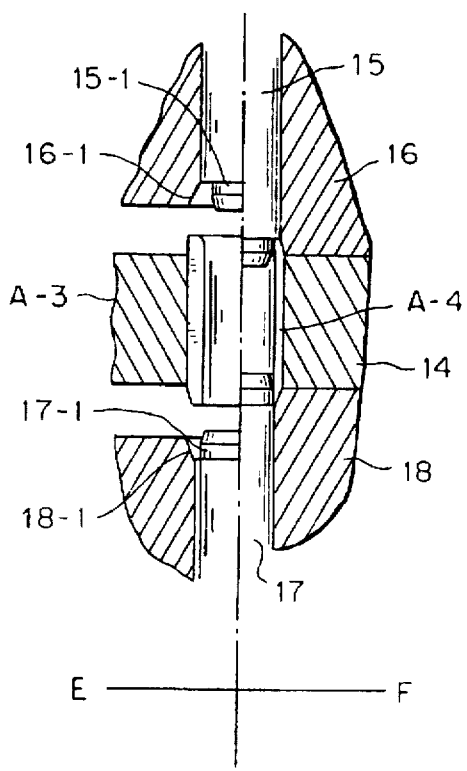
FIG. 6 is a sectional view at the time of molding of the end portions.

4) FIG. 6 shows the detail of molding of both end portion at the step shown in FIGS. 1–8. As shown in FIG. 6, the jig 14 receiving and holding the protruding chamfer portions at both ends is transferred by the index to the molding step at which upper and lower molding dies comprising the dies 16, 18 having the conical surface 16-1, 18-1 having the inlet thereof expanding outward and punches 15, 17 having a guide portion 15-1, 17-1 fitting to the inner diameter of the cylindrical portion and having a flat surface for shaping the end face. The molding dies are so disposed as to face each other in the vertical direction. The both end chamfer portions are then compression molded from the vertical direction. The volume of the space of the molding zone defined by the molding portions 16-1, 18-1 of the dies for molding the end portions, the flat portion for molding the end face of the punch, the guide portions 15-1, 17-1 and the jig 14 is set to be substantially equal to the volume of the chamfer portion disposed at the step of the punching the bottom portion and the flange portion. Therefore, molding can be made to a desired shape without the occurrence of the excess metal. Incidentally, dimensional accuracy of the outer diameter of the cylindrical portion does not change because the work is held by the jig 14. Coarseness of the fracture face of the flange punching portion can be improved because the flange punching fracture surface receives the extreme pressure of the die molding portion 16-1 during the process in which the work is gradually drawn from outside of the end face towards the inside and the coarseness is improved due to the burnishing effect. On the other hand, the chamfer molded portion on the bottom punching side is corrected-by the coarseness of the die molding-surface because it receives the molding load by the molding face 18-1 of the die. After molding of both end portions is completed, the disc-like plate holding the jig 14 is transferred to the next station as the index rotates, and the molded article is discharged from the jig by the ejector pin. To conduct this chamfer molding of both end portions, after the flange punching of the work at the flange punching step, the work is transferred to, and held by, the jig 14 disposed above the circumference of the disc-like plate in the spaced-apart relation, and this jig 14 is transferred to both end molding positions of the next step by the index so as to conduct molding. Accordingly, the deep-drawing step of the plate material can be interconnected to the sequential machining mold, and the sequential machining mold having a unitary structure can be constituted. Because the jigs 14 for receiving the flange punched molded articles of the step 7 are disposed in multiple layers above the circumference of the disc-like plate in a spaced-apart manner, multiple machining can be made and a large number of products can be obtained in one press operation.

As-described above, the present invention reduces the number of process steps by carrying out ironing and punching of the bottom portions at the same step after deep-drawing of the plate material, and constitutes the insertion of the work into the jig disposed on the index plate after punching of the flange portion and molding of the end portion into the sequential machining mold. Accordingly, the present invention can conduct press machining and can accomplish a multiple mold structure for obtaining a plurality of products. Accordingly, the present invention is advantageous in both production efficiency and machining economy.

All references cited herein, including journal articles or abstracts, published or corresponding U.S. or foreign patent applications, issued U.S. or foreign patents, or any other references, are entirely incorporated by reference herein, including all data, tables, figures, and text presented in the cited references. Additionally, the entire contents of the references cited within the references cited herein are also entirely incorporated by reference.

Reference to known method steps, conventional methods steps, known methods or conventional methods is not in any way an admission that any aspect, description or embodiment of the present invention is disclosed, taught or suggested in the relevant art.

The foregoing description of the specific embodiments will so fully reveal the general nature of the invention that others can, by applying knowledge within the skill of the art (including the contents of the references cited herein), readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

I claim:

1. A method of sequentially manufacturing a hollow knock pin comprising the steps of:
   (a) preliminarily molding (1-5) by deep-drawing a plate material (A-0) into a predetermined cup shape (A-1) having a predetermined size, the cup shape including a cylindrical portion including a side wall, a flange portion (A-3) at an upper end of the cylindrical portion, a bottom portion (A-2) at a bottom end of the cylindrical portion, a bottom drawn curved corner surface, and an upper drawn curved corner surface;

(b) providing (i) a cylindrical first punch (9) including a cutting edge at a distal end thereof, and (ii) a first die (10) further including a rounded drawing surface (10-1) at an inlet of the die for ironing an outside of the cylindrical portion, a first curved surface (10-2) at a bottom corner of the die, the first curved surface having a shape corresponding to the bottom drawn curved surface of the cup shape;

(c) simultaneously ironing the side wall and punching out the bottom portion with the first punch and the first die;

(d) providing (i) a second die (13) and (ii) a stepped second punch (11), the second punch including an upper corner step (11-1) including a second curved surface corresponding to the upper drawn curved corner surface of the flange portion and a guide portion for guiding the second punch along an inner diameter of the cylindrical portion;

(e) punching out the flange portion along an outside of the cylindrical portion with the second die and the second punch;

(f) providing a holding jig (14), an upper mold (16) and a lower mold (18) disposed at upper and lower positions, respectively, each of the upper mold and the lower mold further comprising a respective stepped third punch including a flat surface in an outer circumferential direction and a guide portion substantially the same size as the inner diameter of the cylindrical portion, and a third die including a conical molding surface at the inlet of the guide portion; and (g) fitting the cylindrical portion into the holding jig, allowing a chamfer mold portion of the upper and lower end portions of the molded article to protrude, and compression-molding from above and below with the upper mold and the lower mold.

2. The method according to claim 1, including the steps of:

providing a disc-like plate in spaced-apart relation;

disposing the jig above a circumference of the disc-like plate; and using an index to rotate the disc-like plate.

3. The method according to claim 1, wherein the step of preliminarily molding includes upsetting the cylindrical portion, whereby the bottom drawn curved corner surface and the upper drawn curved corner surface are small.

* * * * *